Patented Oct. 22, 1940

2,219,006

UNITED STATES PATENT OFFICE 2,219,006

ADDITION PRODUCTS OF 3,4 DEHYDRO-CYCLOTETRAMETHYLENE SULPHONE

Detlef Delfs, Leverkusen-I. G. Werk, Rhine, Germany, assignor, by mesne assignments, to General Aniline & Film Corporation, New York, N. Y., a corporation of Delaware No Drawing. Application January 21, 1938, Serial No. 186,085. In Germany January 22, 1937

1 Claim. (Cl. 260—329)

The present invention relates to new addition products which are valuable intermediates and auxiliary products for the textile, lacquer, dyestuff and related industries.

My new products are defined by the following formula:

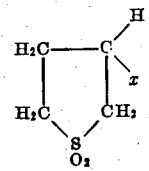

wherein $x$ stands for a member of the group consisting of O—, S— and N= the free bonds of which are satisfied by a member of the group consisting of hydrogen and alkyl.

These products are generally prepared by causing water, hydrogen sulphide, alcohols, ammonia or primary or secondary amines to react upon 3,4-dehydrocyclotetramethylene sulphone, preferably in an alkaline medium.

In case the said starting material is caused to react with water or hydrogen sulphide the resulting hydroxy- or mercaptocyclotetramethylene sulphone easily reacts with another molecule of 3,4-dehydrocyclotetramethylene sulphone, thus yielding products of the type:

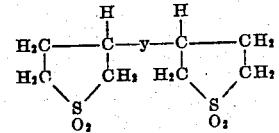

$y$ being O or S.

It is to be understood that in each case the corresponding hydroxy or mercapto compound is formed as intermediate; in reacting with another molecule of 3,4-dehydrocyclotetramethylene sulphone these intermediates act the part of an alcohol.

Particular importance is attached to the products wherein $x$ stands for O-alkyl and among those the products wherein the alkyl contains up to nine carbon atoms. The alkyl may also be of a cyclic nature, it being to be understood that the final products mentioned in the foregoing paragraph are embraced within the scope of my claim. The products of the reaction of methyl alcohol, ethyl alcohol or propyl alcohol are easily soluble in water, whereas the higher members are difficultly soluble and finally insoluble in water.

In case polyvalent alcohols are employed one molecule of the same can react with several molecules of the sulphone. All such possibilities are intended to fall within the scope of my claim.

Amongst the amines which are obtainable in accordance with my present invention there are mentioned as preferred members those wherein $x$ stands for the radical of a primary amine having up to 18 carbon atoms. The higher members in form of their salts with suitable acids are valuable auxiliary products for the textile industry. The substituents which are connected with the nitrogen may also be of cyclic nature, and in case both free bonds of the nitrogen are satisfied by alkyls the latter may be connected in form of a heterocyclic ring system; products of the latter type are obtained, for instance, by the reaction of 3,4-dehydrocyclotetramethylene sulphone and piperidine.

It is to be understood that the alkyls which are connected with the oxygen, sulphur or nitrogen atoms may contain various substituents without departing from the sense of my present invention.

The following examples illustrate my invention without, however, restricting it thereto the parts being by weight:

Example 1

120 parts of 3,4-dehydrocyclotetramethylene sulphone are suspended in a solution of 2 parts of potassium hydroxide in 50 parts of water and stirred at ordinary temperature. After four days the whole mixture has dissolved and after some time the solid reaction product separates. Finally the reaction liquor completely solidifies. Neutralization is effected and the reaction product melting at 157° C. is isolated. It has probably the following constitution:

$$H_2C-\overset{H}{\underset{|}{C}}-O-\overset{H}{\underset{|}{C}}-CH_2$$
$$H_2C\diagdown_{S}\diagup CH_2 \quad H_2C\diagdown_{S}\diagup CH_2$$
$$O_2 \qquad\qquad O_2$$

it being to be understood that the product of the formula $$H_2C-CH.OH$$
$$H_2C\diagdown_{S}\diagup CH_2$$
$$O_2$$

is formed as intermediate.

Example 2

80 parts of potassium hydroxide are dissolved in 2000 parts of methanol. During 10 hours at 25° C. 4000 parts of 3,4-dehydrocyclotetramethylene sulphone are added while stirring. Stirring is continued for a further 24 hours. Now first sulphuric acid is added until the liquid turns Congo paper blue and then potassium or magnesium carbonate is added in excess. The separated salts are removed by filtration and the ether which has probably the following constitution:

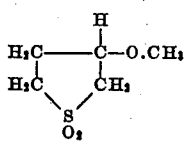

is obtained by distilling off the excess methanol. Distillation of the ether in vacuo yields a colorless, odorless liquid, boiling point 164° C. under a pressure of 12.5 mm. The ether is miscible with water and most organic solvents.

The methyl alcohol may be replaced by any other alcohol. The product of the reaction of ethyl alcohol has the melting point 30° C. and is also miscible with water. Both propyl ethers are liquid and also miscible with water, though not in every proportion. The butyl ethers likewise represent liquids but are difficultly soluble in water; the n-butyl ether has a boiling point 179° C. at 13 mm. pressure. The isohexyl ether is liquid and practically insoluble in water; it has a boiling point 192° C. at 13 mm. pressure. The benzyl ether is a viscous liquid of the boiling point 212° C. at 4 mm. pressure. The product of the addition of one mol of 3,4-dehydrocyclotetramethylene sulphone and one mol of ethylene glycol is a hygroscopic oil of the boiling point 210° C. at 3.5 mm. pressure. The products of the addition of ethylene glycol monomethyl or monoethyl ether are water-soluble liquids of the boiling point 171 or 170° C. at 3 mm. pressure. The product of the reaction of 2 mols of 3,4-dehydrocyclotetramethylene sulphone and 1 mol of ethylene glycol has a melting point 157° C. The 3,4-dehydrocyclotetramethylene sulphone may also be reacted upon with mixtures of different alcohols. In case the mixture of 35% of 1,3-propylene glycol, 40% of glycerine and 25% of hexit is employed in such a proportion that 3 hydroxy groups are present within each one molecule of the sulphone, there is obtained a highly viscous water-soluble reaction product. Furthermore, the mixed alcohols obtained by the catalytic hydration of coconut oil can be employed; the resulting product is a solid compound which cannot be distilled in vacuo without decomposition.

With respect to the working conditions the potassium hydroxide can be replaced by other alkaline reaction products such as sodium hydroxide or alkali metal alcoholates. The reaction temperature can vary within wide limits. Advantageously the reaction is carried out below 65° C. Thereby decomposition of the unsaturated sulphone which already becomes evident at 80° C. is avoided. It is further advantageous to work without access of air.

Example 3

In this example there is employed as starting material the fraction boiling between about 145–162° C. of the mixtures of alcohols obtainable by causing hydrogen to react upon carbon oxide in the presence of catalyst. In 1250 parts of this mixture of alcohols there are dissolved 20 parts of potassium hydroxide, 1000 parts of 3,4-dehydrocyclotetramethylene sulphone are gradually added thereto. After several hours' stirring the sulphone has been completely dissolved, whereupon the temperature must be kept below about 30° C. by cooling. After 12 hours' stirring the potassium hydroxide is neutralized, the salts are removed by filtration and the non-reacted alcohols are removed by heating in vacuo. 1800 parts of an oily reaction product are obtained which has the boiling point 192–196° at 12 mm. pressure. If the above-mentioned fraction is replaced by the fraction boiling between 160–220°, an addition product of similar properties is obtained.

Example 4

120 parts of 3,4-dehydrocyclotetramethylene sulphone are stirred with a solution of 50 parts of 62% sodium hydrosulphide in 200 parts of water at 60–65° C. After two hours the separated oil solidifies. After two hours' standing the mixture is cooled and the reaction product is isolated (melting point 192° C.); it has probably the following constitution:

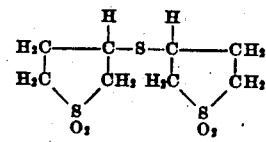

it being to be understood that the product of the formula:

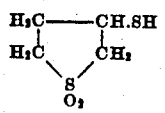

is formed as intermediate.

Example 5

40 parts of 3,4-dehydrocyclotetramethylene sulphone are dissolved together with 31 parts of thioglycolic acid in 150 parts of water and at 60–70° C. 27 parts of sodium hydroxide are added. The addition reaction takes place very quickly and is finished after 4 hours. The solution contains 13 parts of free sodium hydroxide.

Example 6

600 parts of 3,4-dehydrocyclotetramethylene sulphone are heated in an autoclave with 1000 parts of liquid ammonia to 65° C. After 28 hours the product formed is isolated. It consists mostly of a primary amine probably of the constitution:

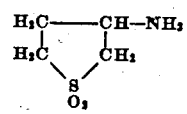

It represents a viscous liquid easily soluble in water.

Example 7

120 parts of 3,4-dehydrocyclotetramethylene sulphone are caused to react with 500 parts of a 25% methylamine solution in an autoclave at 60–70° C. The reaction product chiefly consists of a secondary amine probably of the constitution:

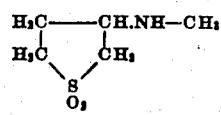

It represents a hygroscopic water-soluble liquid which can be distilled in vacuo.

The methylamine can be replaced by various other amines. Thus ethanolamine yields a highly viscous hygroscopic liquid which crystallizes on standing. Piperidine yields the corresponding tertiary amine which is liquid at ordinary temperature. Dodecylamine and higher amines yield well crystallized compounds.

I claim:

The products of the formula:

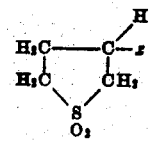

wherein $x$ stands for an O.alkyl radical, the alkyl having up to 9 carbon atoms.

DETLEF DELFS.